D. C. WATT AND F. A. GREARSON.
VEHICLE TOP ATTACHMENT.
APPLICATION FILED OCT 6, 1916. RENEWED JAN. 28, 1921.
1,376,491.
Patented May 3, 1921.
2 SHEETS—SHEET 1.
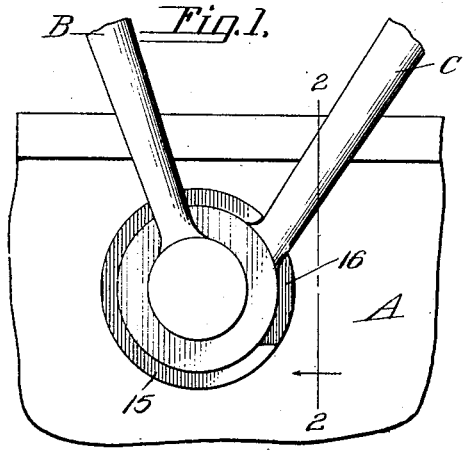
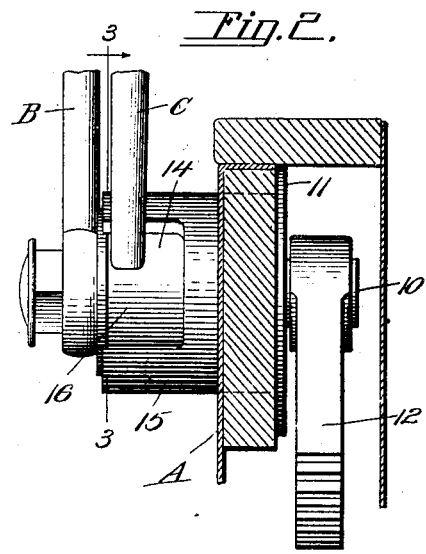
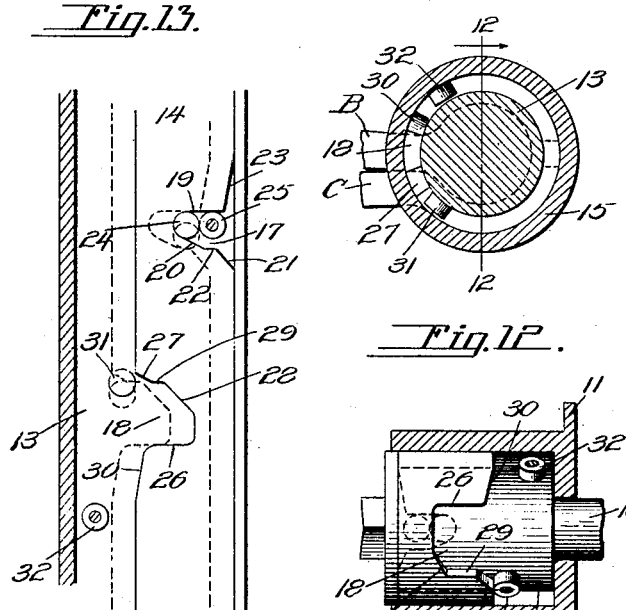
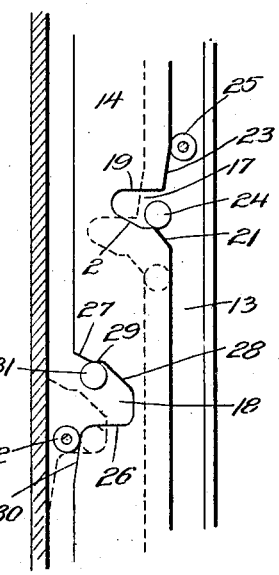
Inventor
Delton C. Watt.
Frederick A. Grearson.
Witnesses
By Victor J. Evans
Attorney D. C. WATT AND F. A. GREARSON.
VEHICLE TOP ATTACHMENT.
APPLICATION FILED OCT 6, 1916. RENEWED JAN. 28, 1921.
1,376,491.
Patented May 3, 1921.
2 SHEETS—SHEET 2.
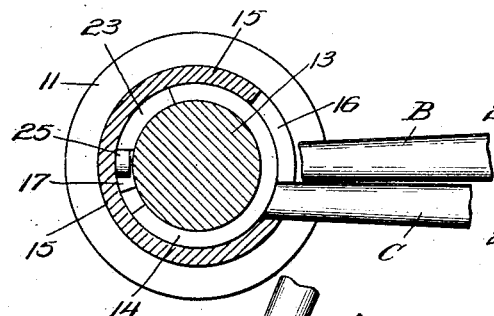
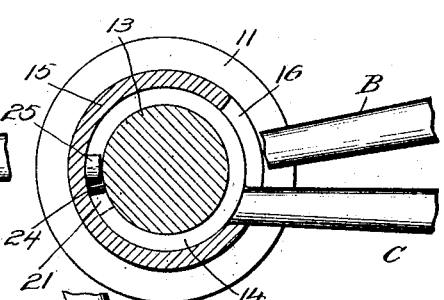
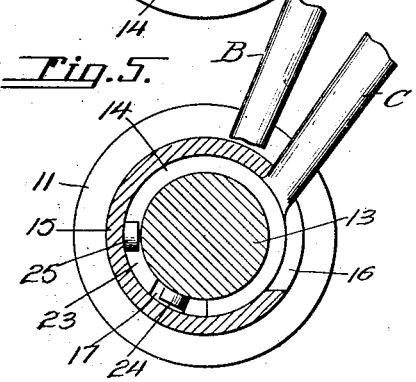
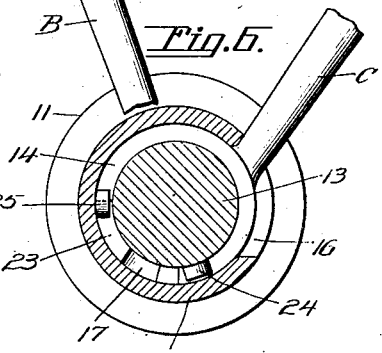
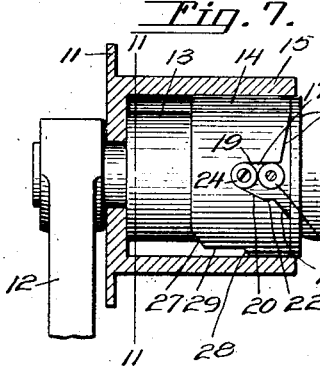
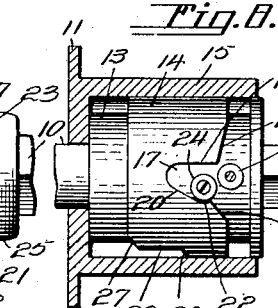
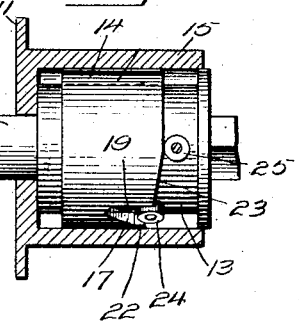
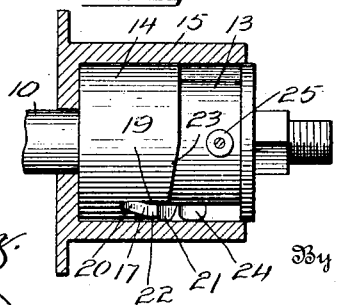
Inventor
Delton C. Watt.
Frederick A. Grearson.
Witnesses
By Victor J. Evans
Attorney

UNITED STATES PATENT OFFICE.

DELTON C. WATT, OF DANVILLE, AND FREDERICK A. GREARSON, OF BARRE, VERMONT.

VEHICLE-TOP ATTACHMENT.

1,376,491.      Specification of Letters Patent.      Patented May 3, 1921.

Application filed October 6, 1916, Serial No. 124,130. Renewed January 28, 1921. Serial No. 441,095.

*To all whom it may concern:*

Be it known that we, DELTON C. WATT and FREDERICK A. GREARSON, citizens of the United States, residing, respectively, at Danville, county of Caledonia, and Barre, county of Washington, State of Vermont, have invented new and useful Improvements in Vehicle-Top Attachments, of which the following is a specification.

The invention relates to a foldable top attachment, and more particularly to the class of bow operating clutches for vehicle, boat, automobile or the like tops.

The primary object of the invention is the provision of a clutch of this character wherein, on moving the power or operating bow of a foldable top, the auxiliary bow will be automatically locked therewith for simultaneous movement, thus rendering both of said bows operative for the extending or folding of the top when being automatically raised or lowered.

Another object of the invention is the provision of a clutch of this character wherein the construction thereof renders it automatically operable for the positive movement of the power and auxiliary bows of a top so that the strain thereon will be equalized and the action thereof uniform on the raising and lowering of said top.

A further object of the invention is the provision of a clutch of this character wherein the power and auxiliary bows are held in operative relation thereto so that on movement of one of the bows a similar movement will be imparted to the other and in this manner assuring positive operation without undue strain upon one or in excess of the other and at the same time expediting the folding and extending of the top for a vehicle, automobile or the like.

A still further object of the invention is the provision of a clutch of this character which is extremely simple in construction, thoroughly reliable and efficient in operation, strong, durable and inexpensive in manufacture and installation.

Other objects will be in part obvious and in part hereinafter set forth.

The invention accordingly relates to the features of construction, combination of elements and arrangement of parts which will be exemplified in the construction hereinafter described, and the scope of the application of which will be indicated in the appended claims.

In the accompanying drawings:

Figure 1 is a fragmentary side elevation of a vehicle body and top bows showing the attachment constructed in accordance with the invention applied, the bows being raised;

Fig. 2 is a sectional view on the line 2—2 of Fig. 1, looking in the direction of the arrow;

Fig. 3 is a sectional view on the line 3—3 of Fig. 2, looking in the direction of the arrow and showing the normal position of the bows when the top is lowered;

Fig. 4 is a view similar to Fig. 3, showing the initial movement of the power bow;

Fig. 5 is a view similar to Fig. 4, showing a further movement of the bows;

Fig. 6 is a view similar to Fig. 5, showing the bows in position when the top is raised;

Fig. 7 is a vertical sectional view through the shell or housing for the clutch, with the clutch in side elevation in normal position when the bows are lowered;

Fig. 8 is a view similar to Fig. 7 showing another position of the clutch during the movement of the bows;

Fig. 9 is a view similar to Fig. 8, showing a further movement of the clutch;

Fig. 10 is a view similar to Fig. 9, showing the clutch in its completed movement when the bows are raised;

Fig. 11 is a sectional view on the line 11—11 of Fig. 7;

Fig. 12 is a sectional view on the line 12—12 of Fig. 11;

Fig. 13 is a diagrammatic plan view showing by full lines the normal position of the clutch and by dotted lines the shifted position thereof;

Fig. 14 is a view similar to Fig. 13, showing by full lines the reverse movements of the clutch.

Similar reference characters indicate corresponding parts throughout the several views of the drawings.

Referring to the drawings in detail, A designates a portion of the side of a vehicle or automobile body; B, a portion of the power bow and C, a portion of the auxiliary bow of the vehicle or automobile top which is of the folding type of any ordinary well known construction. The power bow B is fastened upon a rocking shaft 10 which is journaled in a bearing plate 11 suitably secured interiorly of the side A, as shown, and on the inner end of this shaft 10 is fixed a toothed segment 12 which is operated through the medium of connection with a motor or by a hand lever under the control of the user of the vehicle or automobile. In other words, the power bow B is positively moved for the raising and lowering of the top.

Integral with or fixed to the shaft 10 is a hub 13 upon which is loosely mounted a clutch sleeve 14 having integral therewith or connected thereto the auxiliary bow C and incasing the hub 13 and sleeve 14 is a shell or housing 15 which is stationarily mounted in the side A of the vehicle or automobile body. It is of course to be understood that there are arranged on opposite sides of the vehicle or automobile body the shells or housings having therein the hubs and sleeves hereinbefore described, but the detail construction and manner of operation of a single clutch will be hereinafter given as it will suffice for both employed with a folding top for a vehicle, automobile or the like.

The shell or housing 15 is cut away at 16 at one point thereof to form a clearance for the free movement of the auxiliary bow C when acted upon by the clutch sleeve 14 which has formed therein at diametrically opposite points and opening through opposed free edges, notches 17 and 18 respectively, the notch 17 being formed with a straight edge 19 and opposite cam edges 20 and 21 respectively and a straight shoulder 22 intermediate said cam edges, and this shoulder is parallel with the straight edge 19, while meeting the latter is a beveled portion 23 which coöperates with friction rollers 24 and 25 mounted on the hub and shell or housing 15 respectively.

The notch 18 in the edge of the sleeve 14 is of a greater size than the notch 17 and is formed with a straight edge 26, cam edges 27 and 28 and an intermediate straight shoulder 29, which is parallel with the straight edge 26, the latter having merging into the same the beveled portion 30 and also coöperative therewith are the rollers 31 and 32 mounted upon the hub 13 and shell 15 respectively at points diametrically opposite the location of the rollers 24 and 25 which coöperate with the notch 17 for a purpose presently described. The rollers 24 and 25 and also the rollers 31 and 32 serve to move the sleeve 14 longitudinally on the hub 13 for alternate clutch and release engagement of the power and auxiliary bows of the foldable top so that on the initial movement of the power bow when the top is in lowered position positive movement will be imparted to the auxiliary bow for the coöperation thereof with the power bow to raise or extend the top when the power bow is continued in its movement and vice versa when the top is being lowered or folded.

Assuming that the top for the vehicle or automobile is in normal folded position and it is desired to raise or extend the same, the bows B and C being normally in the position shown in Fig. 3 of the drawing, and when movement is imparted to the toothed segment 12 the power bow is initially moved to the position shown in Fig. 4 of the drawing. When the bows are in the position shown in Fig. 3 of the drawing the clutch sleeve 14 is in the position shown in Fig. 7 and upon the initial movement of the power bow B the sleeve 14 has been shifted to the position shown in Fig. 8 of the drawings and on the continued movement of the power bow to the position shown in Fig. 6 of the drawings the sleeve 14 will be further moved to the position shown in Fig. 9 and in its completed movement assumes the position shown in Fig. 10 of the drawing.

On the folding or lowering of the top the sleeve 14 is reversed in its movement upon the hub 13 under the action of the rollers 31 and 32 working within the notch 18 so that both bows B and C will have positive movements for the raising and lowering of the top and the strain thereon will be uniform without the possibility of any lost motion during the raising and lowering of the top. The rollers 24 and 25 play upon the edges of the notch 17 while the rollers 31 and 32 play upon the edges of the notch 18 for the automatic reverse movement of the clutch sleeve 14, as has been hereinbefore set forth, for the positive movements of the bows B and C of the top when raised and lowered. The action of the clutch enables a positive movement of both bows A, and B, at the proper intervals of time to extend the cover of said top, without strain upon either one or all of the bows or cover, thereby raising and lowering the top resistance from any of the bows and with uniformity and ease of operation.

From the foregoing description, taken in connection with the accompanying drawings, the construction and operation of the herein described vehicle top attachment will be readily understood and, therefore, a more extended explanation has been omitted.

Having thus described our invention, we claim:

1. The combination with a plurality of folding top supporting members having independent pivotal movement, and one of which is adapted to be moved by directly applied power, of a shiftable clutch device operating during a portion of both the top elevating and top collapsing movements of the power member to connect the pivot ends of said members and effect simultaneous movement thereof.

2. The combination with a power bow and an auxiliary bow, of a shaft supporting said power bow and fixed thereto, a clutch loose on said shaft and supporting the auxiliary bow, and means operable by the rotation of the shaft for moving the clutch to a position to effect simultaneous movement of the power and auxiliary bows.

3. The combination with a power bow and an auxiliary bow, of a shaft supporting said power bow and fixed thereto, a clutch loose on said shaft and supporting the auxiliary bow and having cam notches, and stationary and movable elements coöperating with the cam notches to shift the clutch on rotation of the shaft to effect simultaneous movement of the power and auxiliary bows.

4. The combination with a power bow and an auxiliary bow, of a shaft supporting said power bow and fixed thereto, a clutch loose on said shaft and supporting the auxiliary bow and having cam notches, stationary and movable rollers coöperating with the cam notches for moving the clutch on rotation of the shaft to effect simultaneous movement of the power and auxiliary bows, and a housing for the clutch.

5. The combination with a power bow and an auxiliary bow, of a shaft supporting said power bow and fixed thereto, a clutch loose upon said shaft and supporting the auxiliary bow and having cam notches, a housing for the clutch, and stationary and movable rollers mounted on the housing and shaft respectively and coöperating with the cam notches on rotation of the shaft to effect simultaneous movement of the power and auxiliary bows.

In testimony whereof we affix our signatures.

DELTON C. WATT.
FREDERICK A. GREARSON.